UNITED STATES PATENT OFFICE.

LEVI L. HILL, OF GREENPORT, NEW YORK.

IMPROVEMENT IN BURNING-FLUIDS.

Specification forming part of Letters Patent No. 20,558, dated June 15, 1858; Reissue No. 1,416, dated February 24, 1863.

*To all whom it may concern:*

Be it known that I, LEVI L. HILL, of Greenport, in the county of Columbia and State of New York, have invented a new and Improved Compound for Producing Light and Heat; and I do hereby declare that the following is a full and exact description.

The nature of my invention consists in the manufacture of a composition of matter which is susceptible of being acted upon by or combining with atmospheric air or other gases in such a manner as to produce a cheap and brilliant light and an economical heat of great intensity.

To enable others skilled in the art to make and use my invention, I will proceed to describe the method of making said chemical compound or mixture and the manner of using the same.

I first prepare wood-tar or coal-tar and crude turpentine, as follows: I heat the tar or turpentine until sufficiently thin, and then agitate it thoroughly with from one to two per cent. of sulphuric acid. In treating coal-tar I use from five to ten per cent. of the acid. I then wash out the acid by means of several changes of hot water. I then thoroughly mix the tar and turpentine, preferring equal parts, though the process will bear various proportions.

In using coal-tar I should state that it is advantageous to follow the acid treatment by chloride of lime or some other deodorizing agent. This mixture is then placed in a common still with or without a portion of water. Into the top of the still I place an air-pipe connected with a bellows or blower. This pipe should project to within one or two inches of the mixture. Another pipe enters this just above the still, and this latter pipe I connect with a generator or reservoir of hydrogen gas. On heating the still to the desired point—say from 150° to 212° Fahrenheit—I open the air-pipe, using a moderate pressure on the bellows, and at the same time let into said air-pipe about one-twentieth the bulk of air used of hydrogen gas. The vapor thus driven over is passed through a coil of pipe immersed in ice-water and collected in a suitable receiver. The distillate is a peculiar combination of the more volatile ingredients of the tar and turpentine, and is eminently fitted to the purpose in hand. I sometimes omit the use of the hydrogen-pipe, and instead thereof place the distillate in a deep jar, at the bottom of which are the materials for generating the hydrogen, and in this case I think I find an advantage in surmounting the jar with a cover, in which is a valve opening upward and loaded with a weight of one or two pounds to a square inch. I would further state that I obtain a great increase of product by mixing the tar and turpentine with about one-fourth their united bulk of pulverized clay previously to their being placed in the still. The compound as above procured I will here designate as "No. 1." I next prepare a mixture as follows: In a deep jar or vessel surmounted, as in the former case, by a cover and valve, I place the materials for generating hydrogen—say one ounce of zinc, two ounces of sulphuric acid, and four ounces of water. I pour upon these a mixture of half a pint of crude resin-oil, one quart of coal-naphtha, preferring crude naphtha, half an ounce of Canada balsam, one-eighth of an ounce of gum-camphor, and one quart of benzole. Having loaded the valve as before, I let the arrangement stand for several hours, after which I decant the oil, treat it with chalk sufficient to remove all acidity, and then after it has become perfectly clear by repose I decant and bottle for use. This mixture I will call "No. 2." My third ingredient is caoutchosine, prepared by distilling caoutchouc at a temperature of about 600° Fahrenheit, redistilling the oily product at a temperature of from 130° to 205° Fahrenheit, and again redistilling the product thus obtained at the lowest possible temperature. I thus obtain a liquid which boils at 90° Fahrenheit. This, when mixed, even in very small quantities, with my other hydrocarbons greatly increases their illuminating-power and renders them more volatile. This I call "No. 3."

Having the above ingredients at hand, I proceed to mix and incorporate them together. Among many proportions which I have tried I prefer the following, viz: one quart of No. 1, two quarts of No. 2, and one ounce of No. 3. These I mix by thorough agitation, and suffer the mixture to stand for one or two days. I then decant the clear liquid from the precipitate formed, when it is ready for use. It is much improved, however, by another repose of two or three weeks. This liquid I will distinguish as "Nubian oil A." To the above quantities of the oil A, I add various proportions of highly-rectified naphtha, or of benzole—say from one pint to a gallon—and thus produce a highly-volatile combination, less flashy and less liable to condense the benzole, and yielding a better and more economical light. This I call "Nubian oil B." By omitting the benzole in oils A and B and substituting therefor from ten to fifty per cent. of caoutchousine I produce Nubian oil C. This will work well at a very low temperature. Nubian oil D, which is designed as a means of economical heat, I prepare by combining mixture No. 1 with about five per cent. of common resin, ten per cent. of resin-oil, twenty per cent. of naphtha, and ten per cent. of spirits of turpentine. To this compound I add small proportions of oils A, B, or C when I wish to increase the volatility of oil D. Said oil D requires to be warmed, when in use, to from 100° to 150° Fahrenheit. My method of using said Nubian oil A or its modifications consists, essentially, in the use of a bellows, air-bag, gasometer, or other means of generating a current of atmospheric air, hydrogen, or carbureted-hydrogen gas, and directing said current of air or gas upon or into said Nubian oil, and passing it thence, by means of pipes, to suitable burners, the temperature of the oil to be maintained at a degree corresponding with the purity of the chemical and the nature of the gas. For hydrogen or carbureted-hydrogen gases the ordinary temperature of the oil is sufficient, as it also is for common air during the mild seasons of the year; but in cold weather the temperature of said oil should be maintained at from 70° to 100° Fahrenheit. I prefer atmospheric air on account of its great economy and its superior effects. In the use of from five to eight cubic feet per hour I produce a flame as large as that of ordinary coal-gas, of very great illuminating-power, and at a cheap rate; but largely diluting said carbonized or catalyzed air with common air, even to the extent of from one hundred to five hundred per cent., I obtain a heating-flame of great purity and extraordinary intensity. For light alone I prefer to use Nubian oil A; but I can use oils B C D, or mixtures of either, or all four of the oils. For heating-flame I prefer to use Nubian oil D, on account of its superior economy; but for the reason of its requiring a higher temperature it may be advantageously mixed with either or all of the other oils in a great variety of proportions.

There are several things in the above process which I do not claim. I do not claim the mere mixture of tar and crude turpentine, nor the above method of making caoutchousine, nor any peculiarity in the form of my apparatus. Neither do I claim the use of benzole or naphtha for carbonizing air or gas, for benzole alone, and benzole mixed with alcohol, has been used for air and naphtha for gas; but

What I claim as my invention, and desire to secure by Letters Patent, is—

1. The use of caoutchousine for imparting greater volatility, as well as greater stability, to my compounds. I wish to be distinctly understood as claiming the use of caoutchousine only in combination with the liquids herein described.

2. As my invention, the liquids herein described as Nubian oils A B C D, having the composition and properties set forth, to be used singly or in such relative proportions and admixture as may appear necessary to accomplish the purpose set forth.

3. Passing a current of atmospheric air over or through the described mixtures or their equivalents of hydrocarbons, fluid and more or less volatile, or rendered so by the mixture or by the application of heat, and using the mixture of air and the vapors of the hydrocarbon for producing light or heat, or both.

LEVI L. HILL. [L. S.]

Witnesses:
W. R. BARRETT,
HATTIE WEBBER.